US010587212B1

(12) United States Patent
Van Dorpe et al.

(10) Patent No.: US 10,587,212 B1
(45) Date of Patent: Mar. 10, 2020

(54) LINEAR MOTOR TRACK SYSTEM WITH AUTOMATIC GRAVITY DETECTION

(71) Applicant: Rockwell Automation Technologies, Inc., Mayfield Heights, OH (US)

(72) Inventors: David D. Van Dorpe, Eden Prairie, MN (US); Mark R. Cooper, Eden Prairie, MN (US); Shankernarayan Ramanarayanan, Eden Prairie, MN (US); Patrick E. Ozimek, Mequon, WI (US); Jadav Das, Lake Grove, NY (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/186,960

(22) Filed: Nov. 12, 2018

(51) Int. Cl.
| | |
|---|---|
| *H02P 7/025* | (2016.01) |
| *H02P 29/028* | (2016.01) |
| *H02K 11/21* | (2016.01) |
| *B65G 35/06* | (2006.01) |
| *H02K 41/035* | (2006.01) |
| *H02K 11/30* | (2016.01) |

(52) U.S. Cl.
CPC .............. *H02P 7/025* (2016.02); *B65G 35/06* (2013.01); *H02K 11/21* (2016.01); *H02K 11/30* (2016.01); *H02K 41/0358* (2013.01); *H02P 29/028* (2013.01)

(58) Field of Classification Search
USPC ......................................... 318/139
See application file for complete search history.

(56) References Cited

U.S. PATENT DOCUMENTS

| 5,125,347 A * | 6/1992 | Takahashi | B60L 13/03 104/298 |
| 5,394,807 A * | 3/1995 | Sink | B60L 13/006 104/281 |
| 5,497,038 A * | 3/1996 | Sink | H02K 41/03 104/290 |
| 10,164,555 B1 * | 12/2018 | Ozimek | H02P 7/025 |

* cited by examiner

*Primary Examiner* — Bentsu Ro
(74) *Attorney, Agent, or Firm* — Boyle Fredrickson S.C.

(57) ABSTRACT

A mover is configured to be electromagnetically propelled along a track in a linear motor track system with a force that is calculated to include compensation for gravity. A multi-axis accelerometer arranged in each segment of the track can detect an orientation or angle of the track segment for determining gravity with respect to the particular section. As a result, if the track is at an incline, such as a ramp, a desired force for moving a mover along the track can be compensated to include gravity due to the incline for achieving a desired motion result. In addition, the detected orientation of the track can be compared to an expected orientation stored by a control program to avoid a loss of performance due to physical changes in the track not matching an expected/programmed configuration of the track.

20 Claims, 7 Drawing Sheets

LINEAR MOTOR TRACK SYSTEM WITH AUTOMATIC GRAVITY DETECTION

FIELD OF THE INVENTION

The present invention relates to motion control systems and, more specifically, to motion control systems including a track segment for linear motor drive systems supporting movers on tracks in which power for electromagnetically propelling a mover is controlled to include a desired force for moving the mover along a track segment when arranged in a reference orientation and a compensated force for compensating for an orientation of the track segment differing from the reference orientation.

BACKGROUND OF THE INVENTION

Motion control systems utilizing movers and linear motors can be used in a wide variety of processes (e.g. packaging, manufacturing, and machining) and can provide an advantage over conventional conveyor belt systems with enhanced flexibility, extremely high speed movement, and mechanical simplicity. The motion control system includes a set of independently controlled "movers" each supported on a track for motion along the track. The track is made up of a number of track segments or sections that, in turn, hold individually controllable electric coils. Successive activation of the coils establishes a moving electromagnetic field that interacts with the movers and causes the mover to travel along the track. Sensors, such as Hall Effect sensors or Magnetoresistance sensors, may be spaced at fixed positions along the track and/or on the movers for detecting opposing magnets to provide information about the position and speed of the movers.

Each of the movers may be independently moved and positioned along the track in response to the moving electromagnetic field generated by the coils. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

Motion of the movers along the track can be susceptible to disturbances, such as gravity, Such disturbances can inhibit the movers from achieving an expected motion that may be desired. It is therefore desirable to provide an improved linear motor drive system that may overcome one or more of the aforementioned drawbacks.

SUMMARY OF THE INVENTION

A mover is configured to be electromagnetically propelled along a track in a linear motor track system with a force that is calculated to include compensation for gravity. A multi-axis accelerometer arranged in each segment of the track can detect an orientation or angle of the track segment for determining gravity with respect to the particular section. As a result, if the track is at an incline, such as a ramp, a desired force for moving a mover along the track can be compensated to include gravity due to the incline for achieving a desired motion result. In addition, the detected orientation of the track can be compared to an expected orientation stored by a control program to avoid a loss of performance due to physical changes in the track not matching an expected/programmed configuration of the track.

In one aspect, linear motor track systems can be oriented in any angle. Servo control loops can be improved by compensating for a gravity vector acting on movers in the system as a known disturbance. The servo controller can detect the gravity vector at each section of the track. Undesired behavior can be avoided if a certain orientation which was assumed at program time is changed during commissioning or run time. A sensor can be used for automatic detection of the gravity vector at each section. For example, a MEMS accelerometer sensor can be used. Automatic "keying" of a programmed orientation, which may be configured in a configuration software, such as Logix as available from Rockwell Automation, Inc., can be done with respect to actual orientation of the section. Such keying could be done in discrete angle steps (such as 0°, 45°, 90°, and so forth). As a result, a mover control system can automatically compensate for changes to the gravity vector experienced by the mover. In addition, programmed orientation of the system can be keyed against a physical (detected) mounting orientation. Automatic detection allow any-angle mounting for sections of track to be compensated. Also, keying actual orientation against user input can be used to ensure the programmer's intent of orientation is correctly implemented by the system commissioner. For example, a programmer might have assumed an upright track in which all movers are brought to a bottom section in a "Track-Stop" routine. However, if this orientation is changed during commissioning, it may result in undesired effect, such as a free-fall of movers during execution of the Track Stop routine. A keying-mismatch error according to the present invention could warn of this condition.

In one aspect, to determine an appropriate gravity compensation force to apply with respect to a mover, a measured gravity vector can be applied with an instantaneous direction of travel of the mover. Information defining the direction of travel can be stored in each section, at each position along the section, as a 3 dimensional vector on which the mover travels. A section can have arbitrary geometry, and a path of a mover on any given section could follow any 3 dimensional path (and not simply a linear or curved path).

Specifically then, one aspect of the present invention can provide a linear motor drive system, including: a track segment defining a path along which a mover travels, the track segment receiving power from a power supply for electromagnetically propelling a mover, the track segment including: multiple drive coils spaced along the track segment; and a sensor configured to detect an acceleration with respect to the track segment; and a controller in communication with the track segment, the controller executing a program stored in a non-transient medium to control power to the drive coils for electromagnetically propelling a mover with a total force to move the mover along the track segment, wherein the total force comprises: a desired force for moving the mover along a track segment when arranged in a reference orientation; and a compensated force comprising the acceleration for compensating for an orientation of the track segment differing from the reference orientation.

Another aspect of the present invention can provide a method for propelling a mover, including: receiving power from a power supply for electromagnetically propelling a mover along a track segment defining a path on which the mover travels, the track segment including: multiple drive coils spaced along the track segment; and a sensor detecting an acceleration with respect to the track segment; and controlling the power to the drive coils for electromagnetically propelling the mover with a total force to move the mover along the track segment, wherein the total force comprises: a desired force for moving the mover along a track segment when arranged in a reference orientation; and a compensated force comprising the acceleration for compensating for an orientation of the track segment differing from the reference orientation.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
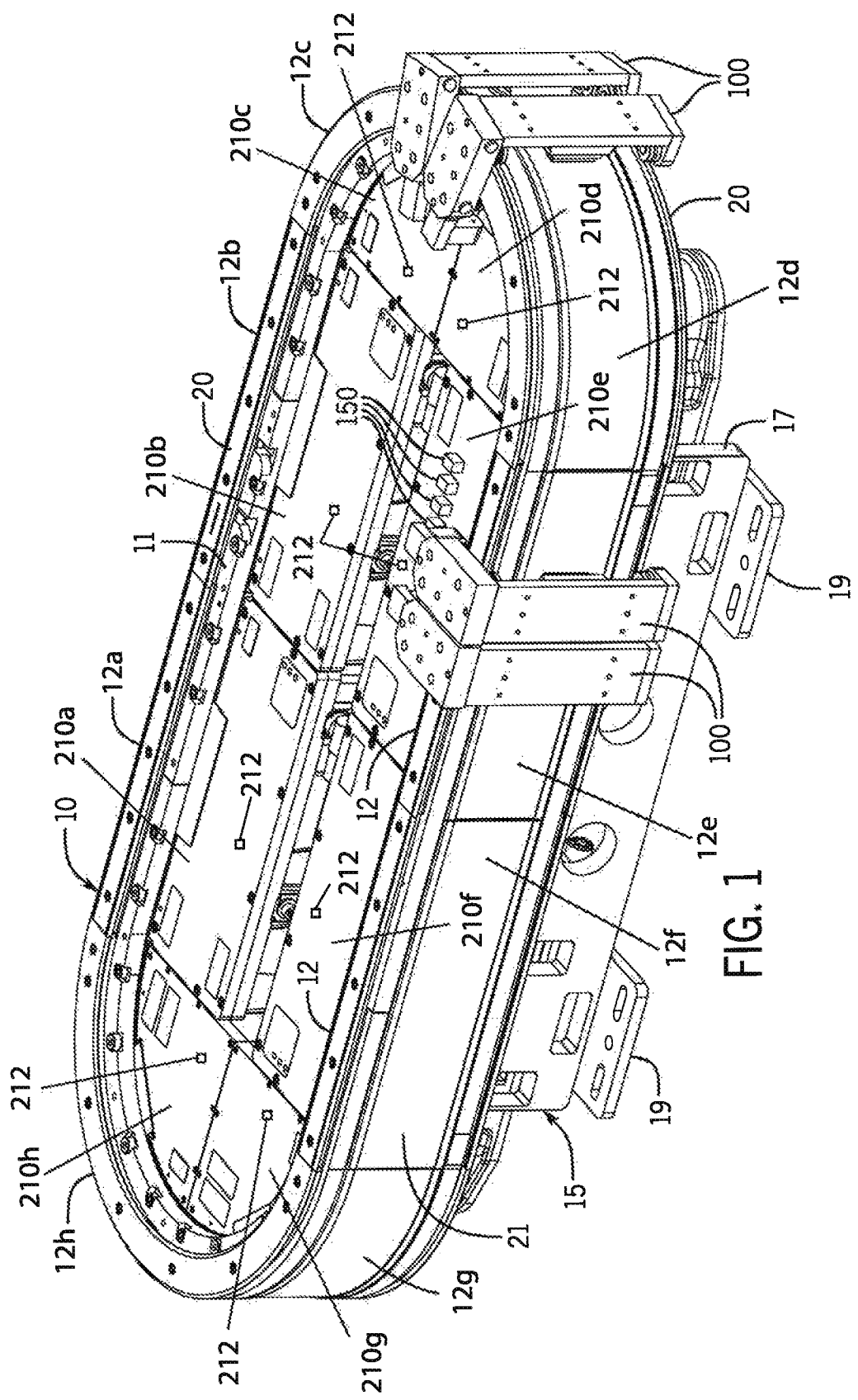
FIG. 1 is an isometric view of an exemplary transport system incorporating multiple movers travelling along a closed curvilinear track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, an exemplary transport system for moving articles or products includes a track 10 made up of multiple segments 12 or sections, such as segments 12a, 12b, 12c and so forth. According to the illustrated embodiment, the segments 12 define a generally closed loop supporting a set of movers 100 movable along the track 10. The track 10 can be oriented in any plane with support from a mounted base 15 extending from the track 10. According to the illustrated embodiment, the base 15 includes a pair of generally planar support plates 17, located on opposite sides of the track 10, with mounting feet 19 on each support plate 17 to secure the track 10 to a surface, such as a floor, wall, ceiling, ramp or the like. The illustrated track 10 includes four straight segments 12, with two straight segments 12 located along each side of the track and spaced apart from the other pair, such as straight segments 12a and 12b on a first side of the track 10, opposite straight segments 12e and 12f on a second side of the track 10. The track 10 also includes four curved segments 12 where a pair of curved segments 12 is located at each end of the track 10 to connect the pairs of straight segments 12, such as curved segments 12c and 12d on a first end of the track, opposite curved segments 12g and 12h on a second end of the track 10. As illustrated, the four straight segments 12 and the four curved segments 12 form a generally oval track and define a closed surface over which each of the movers 100 may travel. It is understood that track segments of various sizes, lengths, and shapes may be connected together to form a track 10 without deviating from the scope of the invention.

For convenience, a horizontal orientation of the track 10 is shown in FIG. 1. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. Further, each track segment 12 is shown in a generally horizontal orientation. The track segments 12 may also be oriented in a generally vertical orientation and the width of the track 10 may be greater in either the horizontal or vertical direction according to application requirements. The movers 100 will travel along the track and take various orientations according to the configuration of the track 10 and the relationships discussed herein may vary accordingly.

Figure 2:
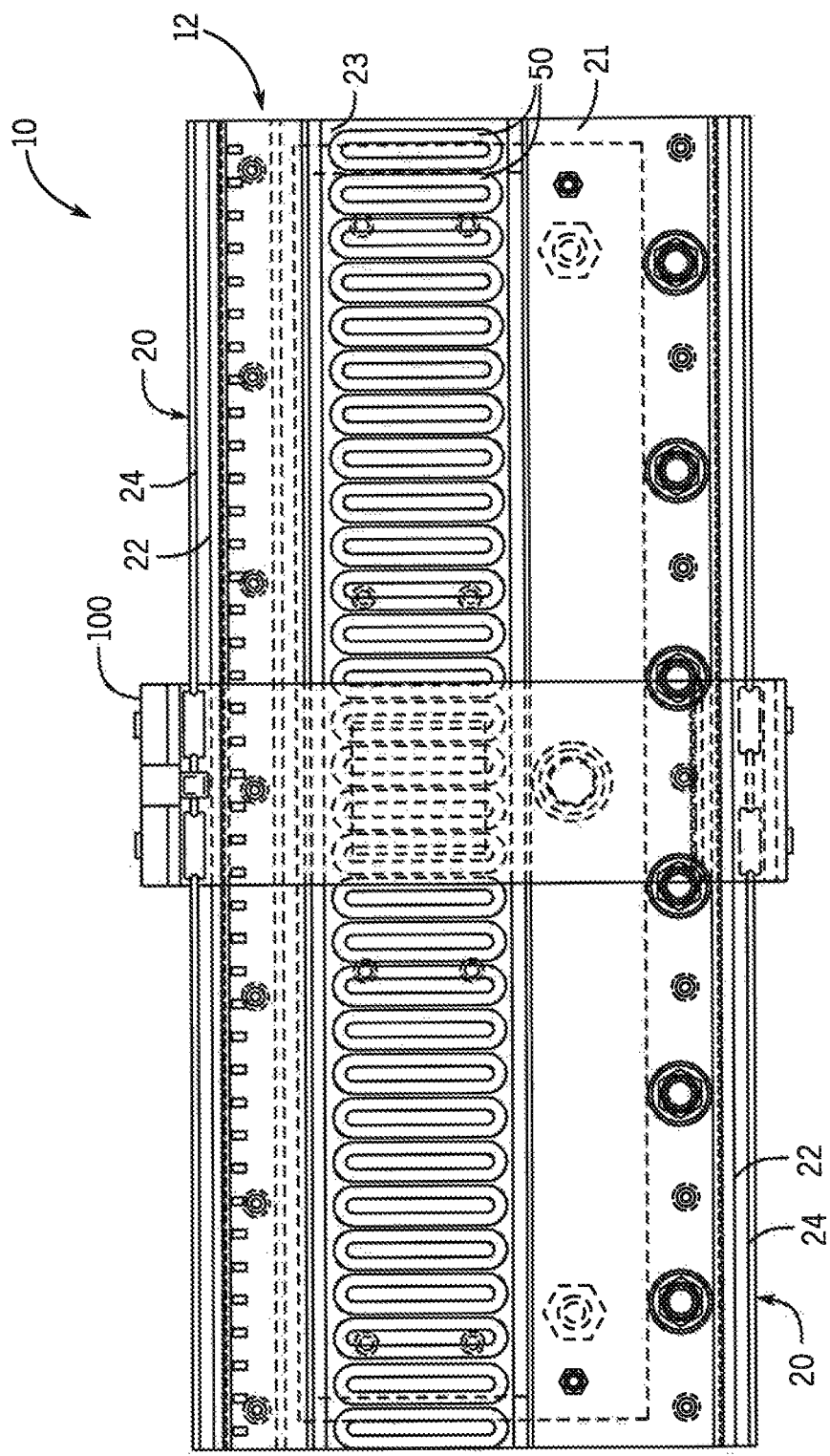
FIG. 2 is a partial side elevation view of one segment of the transport system of FIG. 1 illustrating activation coils distributed along one surface of the track segment.
Figure 3:
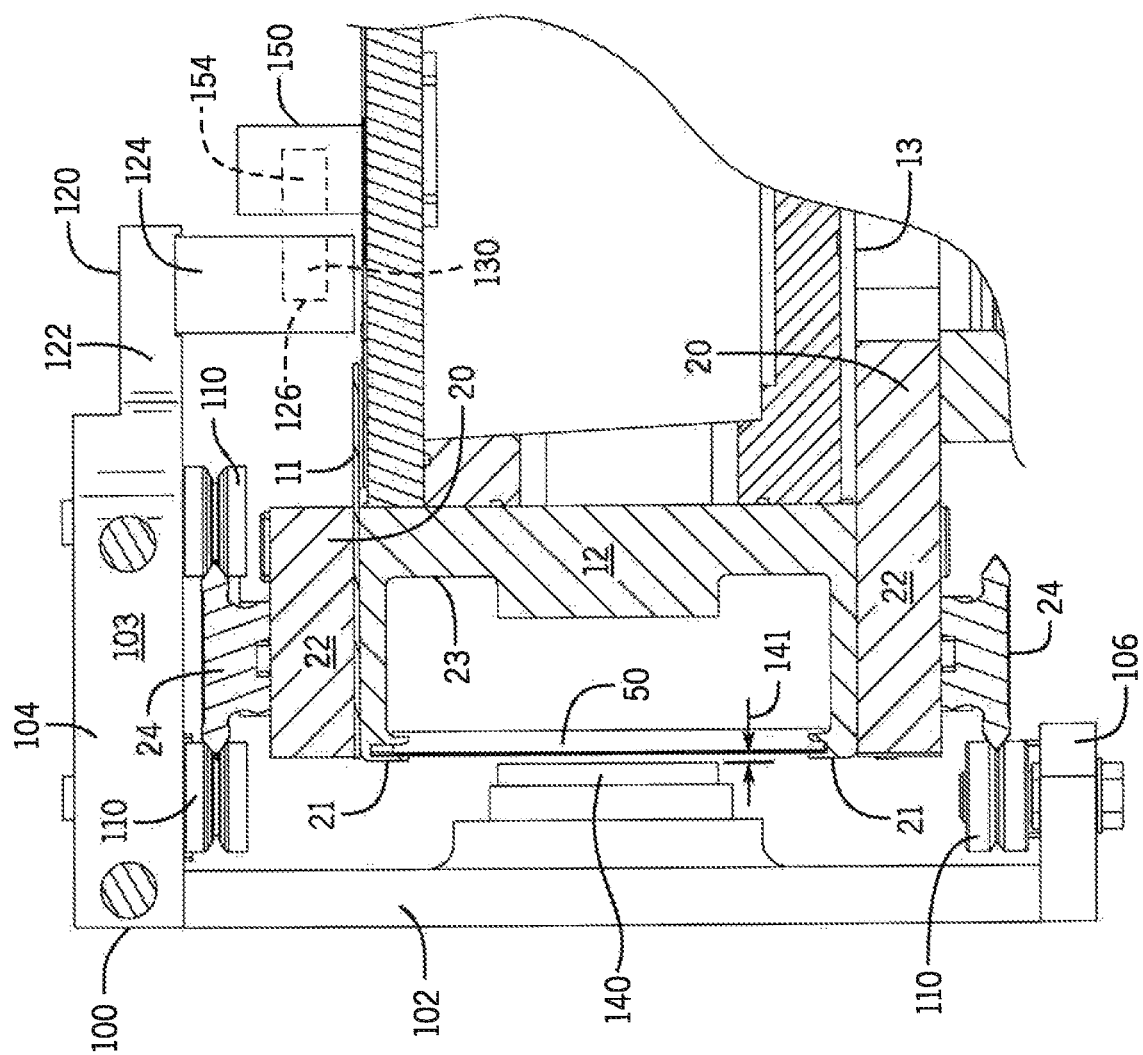
FIG. 3 is a partial sectional view of the transport system of FIG. 1.

Each track segment 12 includes a number of independently attached rails 20 on which each mover 100 runs. According to the illustrated embodiment, rails 20 extend generally along the outer periphery of the track 10. A first rail 20 extends along an upper surface 11 of each segment and a second rail 20 extends along a lower surface 13 of each segment. With reference also to FIGS. 2 and 3, the illustrated embodiment of each rail 20 includes a base 22 and a track portion 24. The base 22 is secured to the upper surface 11 or lower surface 13 of each segment 12 and the track portion 24 is mounted to the base 22. It is contemplated that each rail 20 may be a singular, molded or extruded member or formed from multiple members. It is also contemplated that the cross section of the rails 20 may be circular, square, rectangular, or any other desired cross-sectional shape without deviating from the scope of the invention. The rails 20 generally conform to the curvature of the track 10 thus extending in a straight path along the straight track segments 12 and in a curved path along the curved track segments 12. The rails 20 may be thin with respect to the width of the track 10 and span only a partial width of the surface of the track 10 on which it is attached. Each mover 100 includes complementary rollers 110 to engage the track portion 24 of the rail 20 for movement along the track 10.

One or more movers 100 are mounted to and movable along the rails 20 on the track 10. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. The top member 104 includes a first segment 103, extending orthogonally from the side member 102 for the width of the rail 20, which is generally the same width as the side member 102. A set of rollers 110 are mounted on the lower side of the first segment 103 and are configured to engage the track portion 24 of the rail 20 mounted to the upper surface 11 of the track segment. According to the illustrated embodiment two pairs of rollers 110 are mounted to the lower side of the first segment 103 with a first pair located along a first edge of the track portion 24 of the rail and a second pair located along a second edge of the track portion 24 of the rail 20. The first and second edges and, therefore, the first and second pairs of rollers 110 are on opposite sides of the rail 20 and positively retain the mover 100 to the rail 20. The bottom member 106 extends generally orthogonal to the side member 102 at a bottom end of the side member 102 and extends for a distance sufficient to receive a third pair of rollers 110 along the bottom of the mover 100. The third pair of rollers 110 engage an outer edge of the track portion 24 of the rail 20 mounted to the lower surface 13 of the track segment. Thus, the mover 100 rides along the rails 20 on the rollers 110 mounted to both the top member 104 and the bottom member 106 of each mover 100. The top member 104 also includes a second segment 120 which protrudes from the first segment 103 an additional distance beyond the rail 20 and is configured to hold a position magnet 130. According to the illustrated embodiment, the second segment 120 of the top member 104 includes a first portion 122 extending generally parallel to the rail 20 and tapering to a smaller width than the first segment 103 of the top member 104. The second segment 120 also includes a second portion 124 extending downward from and generally orthogonal to the first portion 122. The second portion 124 extends downward a distance less than the distance to the upper surface 11 of the track segment but of sufficient distance to have the position magnet 130 mounted thereto. According to the illustrated embodiment, a position magnet 130 is mounted within a recess 126 on the second portion 124 and is configured to align with a track sensor 150 mounted to the top surface 11 of the track segment.

A linear motor drive system is incorporated in part on each mover 100 and in part within each track segment 12 to control motion of each mover 100 along the segment. On each mover 100, the linear drive system includes multiple drive magnets 140 mounted to the side member 102. The drive magnets 140 can be arranged in a block along an inner surface of the side member 102 with separate magnet segments alternately having a north pole, N, and south pole, S, pole facing the track segment. The drive magnets 140 are typically permanent magnets, and two adjacent magnet segments including a north pole and a south pole may be considered a pole-pair. The drive magnets 140 are mounted on the inner surface of the side member 102 and when mounted to the track 10 are spaced apart from a series of coils 50 extending along the track 10. As shown in FIG. 3, an air gap 141 is provided between each set of drive magnets 140 and the coils 50 along the track 10. On the track 10, the linear drive system includes a series of parallel coils 50 spaced along each track segment 12 as shown in FIG. 2. According to the illustrated embodiment, each coil 50 is placed in a channel 23 extending longitudinally along one surface of the track segment 12. The electromagnetic field generated by each coil 50 spans the air gap and interacts with the drive magnets 140 mounted to the mover 100 to control operation of the mover 100.

Figure 4:
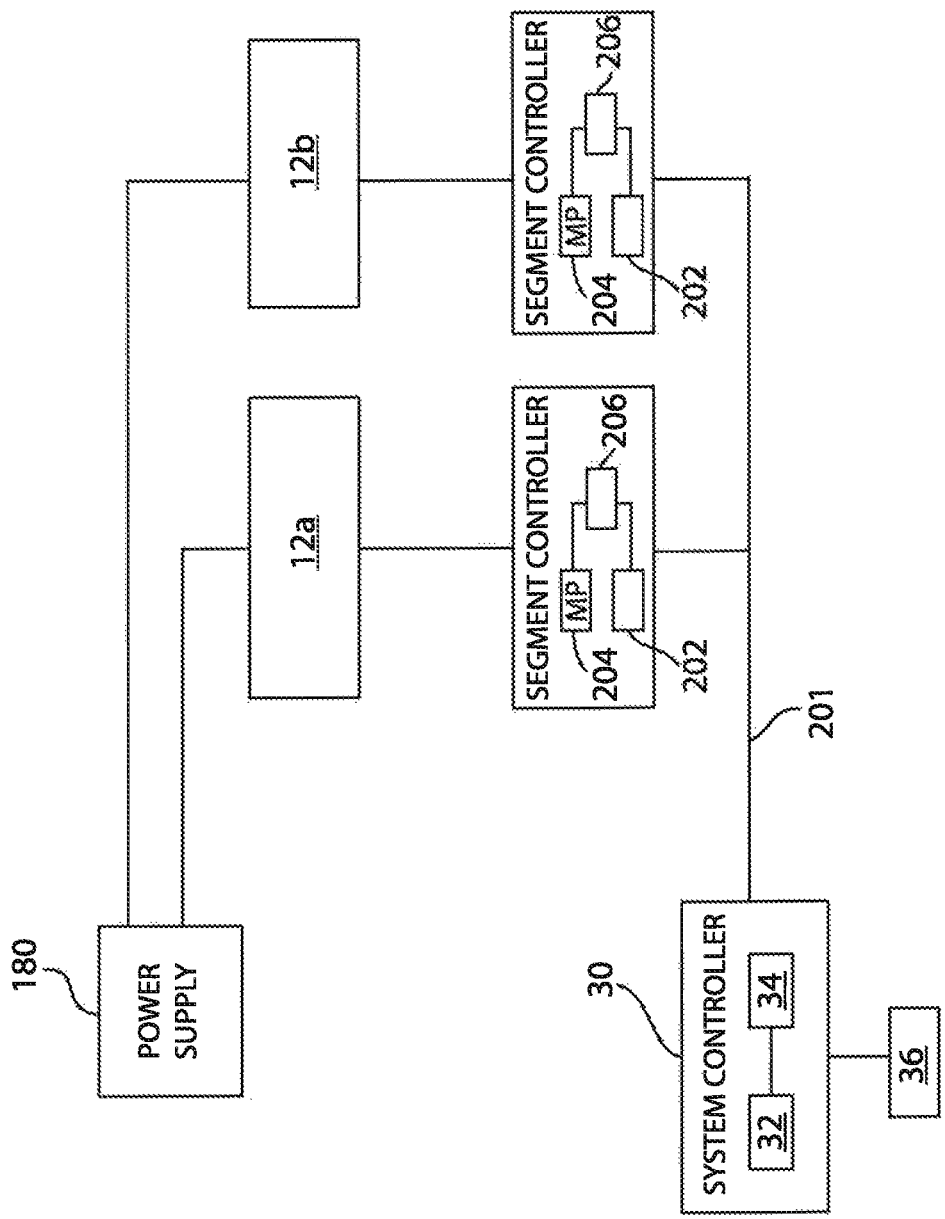
FIG. 4 is a block diagram representation of an exemplary power and control system for the transport system of FIG. 1.

Turning next to FIG. 4, an exemplary power and control system for the track 10 and linear drive system is illustrated. A segment controller 200 is mounted within each segment 12, with first and second segment controllers 200a and 200b for first and second segments 12a and 12b, respectively, shown by way of example. Each segment controller 200 receives command signals from a system controller 30 and generates switching signals for motor phases or power segments controlling activation of corresponding coils 50 in the segments 12 from power provided by a power supply 180. Activation of the coils 50 are controlled by switches in the segments 12 to drive and position movers 100 along the track.

The illustrated motion control system includes a system controller 30 having a processor 32 and a memory device 34. It is contemplated that the processor 32 and memory device 34 may each be a single electronic device or formed from multiple devices. The processor 32 may be a microprocessor. Optionally, the processor 32 and/or the memory device 34 may be integrated on a field programmable array (FPGA) or an application specific integrated circuit (ASIC). The memory device 34 may include volatile memory, non-volatile memory, or a combination thereof. The system controller 30 could be a Programmable Logic Controller (PLC). A user interface 36 is provided for an operator to configure the system controller 30 and to load or configure desired motion profiles for the movers 100 on the system controller 30. It is contemplated that the system controller 30 and user interface 36 may be a single device, such as a laptop, notebook, tablet or other mobile computing device. Optionally, the user interface 36 may include one or more separate devices such as a keyboard, mouse, display, touchscreen, interface port, removable storage medium or medium reader and the like for receiving information from and displaying information to a user. Optionally, the system controller 30 and user interface 36 may be integrated into an industrial computer mounted within a control cabinet and configured to withstand harsh operating environments. It is contemplated that still other combinations of computing devices and peripherals as would be understood in the art may be utilized or incorporated into the system controller 30 and user interface 36 without deviating from the scope of the invention.

One or more programs may be stored in the memory device 34 for execution by the processor 32. The system controller 30 receives one or more motion profiles for the movers 100 to follow along the track 10. A program executing on the processor 32 is in communication with a segment controller 200 on each track segment 12 via a control network 201, such as an EtherNet/IP network. The system controller 30 may transfer a desired motion profile to each segment controller 200 or, optionally, the system controller 30 may perform some initial processing based on the motion profile to transmit a segment of the motion profile to each segment controller 200 according to the portion of the motion profile to be executed along that segment. Optionally, the system controller 30 may perform still further processing on the motion profile and generate a desired switching sequence for each segment 12 that may be transmitted to the segment controller 200.

A network communication interface 202 in each segment controller 200 receives the communications from the system controller 30 and passes the communication to a processor 204 executing in the segment controller 200. The processor may be a microprocessor. Optionally, the processor 204 and/or a memory device 206 within the segment controller 200 may be integrated on a field programmable array (FPGA) or an application specific integrated circuit (ASIC). It is contemplated that the processor 204 and memory device 206 may each be a single electronic device or formed from multiple devices. The memory device 206 may include volatile memory, non-volatile memory, or a combination thereof. The segment controller 200 receives the motion profile, or portion thereof, or the switching sequence transmitted from the system controller 30 and utilizes the motion profile or switching sequence to control movers 100 present along the track segment 12 controlled by that system controller 30.

Referring again to FIG. 1, each track segment 12 can include a Printed Circuit Board (PCB) 210, such as a first PCB 210a at segment 12a, a second PCB 210b at segment 12b, and so forth, with multiple electronics mounted thereon. Such electronics can include a segment controller 200 and a sensor 212 configured to detect an acceleration with respect to the track segment 12. In particular, the sensor 212 could be a triple axis micro electro mechanical system (MEMS) digital accelerometer configured to detect x, y and z components of acceleration. A controller in communication with the track segment, such as the segment controller 200 or the system controller 30, can execute a program to control power from the power supply 180 to the coils 50 for electromagnetically propelling movers 100 along the track. Such power can be controlled to produce a total force ("$F_{TOTAL}$") to move the mover 100 along the track segment 2. The total force can include: a desired force ("$F_D$") for moving the mover 100 along a track segment 12 when the track segment 12 is arranged in a reference orientation, such as substantially horizontal or flat with an angle of 0° with respect to the ground; and a compensated force ("$F_{COMP}$") comprising the acceleration detected by the sensor 212 for compensating for an orientation of the track segment differing from the reference orientation, such as a non-zero angle with respect to the ground. The compensated force will typically comprise acceleration due to gravity on the track segment 12 being a static system. The acceleration will typically be a vector sum of the aforementioned x, y and z components.

Figure 5:
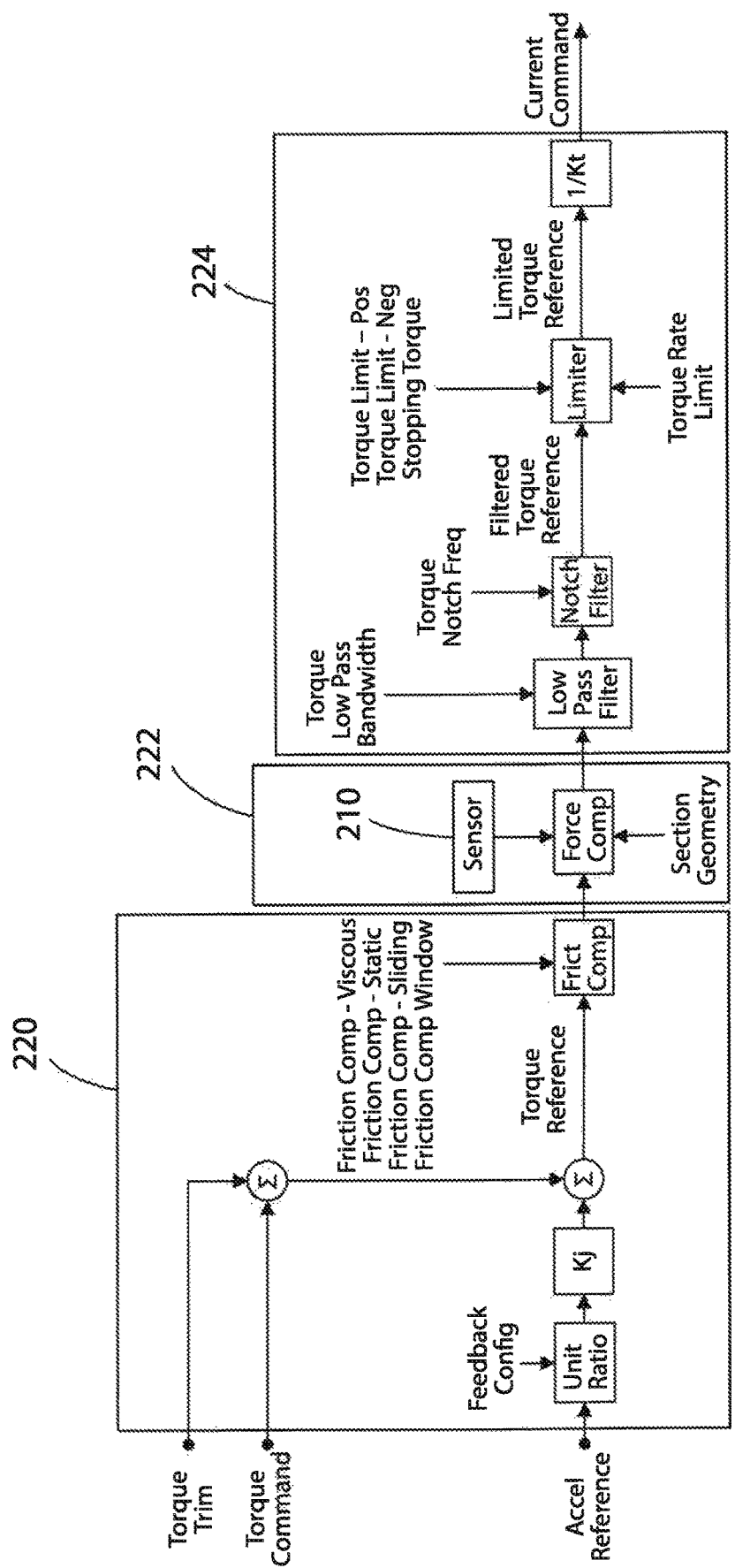
FIG. 5 is a block diagram representation of an exemplary servo control system propelling a mover with force in the transport system of FIG. 1.

With additional reference to FIG. 5, to move a mover 100 along a track segment, a controller, which could be the segment controller 200 or system controller 30, depending on where the motion profile is determined, can execute a servo control loop to determine the desired motion. In particular, to implement the motion profile with varying position and speed, the controller can continuously calculate a torque command and a torque trim or offset, compared to an acceleration reference, in a force command block 220 to provide a force command for moving the mover 100. Then, the force command can be compensated in a force compensation block 222 to provide an adjusted or total force command which accounts for forces due to acceleration (by gravity) detected by the track segment 12. In the force compensation block 222, the controller can read the sensor 212 to detect an acceleration vector at the track segment 12, which the controller can use, along with stored section geometry data indicative of the section geometry of the track segment, to compensate the force. Then, the force command can be translated into in a current command at a current command block 224. The current command can be used to control power, sourced from the power supply 180, to the coils 50 for electromagnetically propelling the mover 100 along the track segment 12 as desired.

Figure 6:
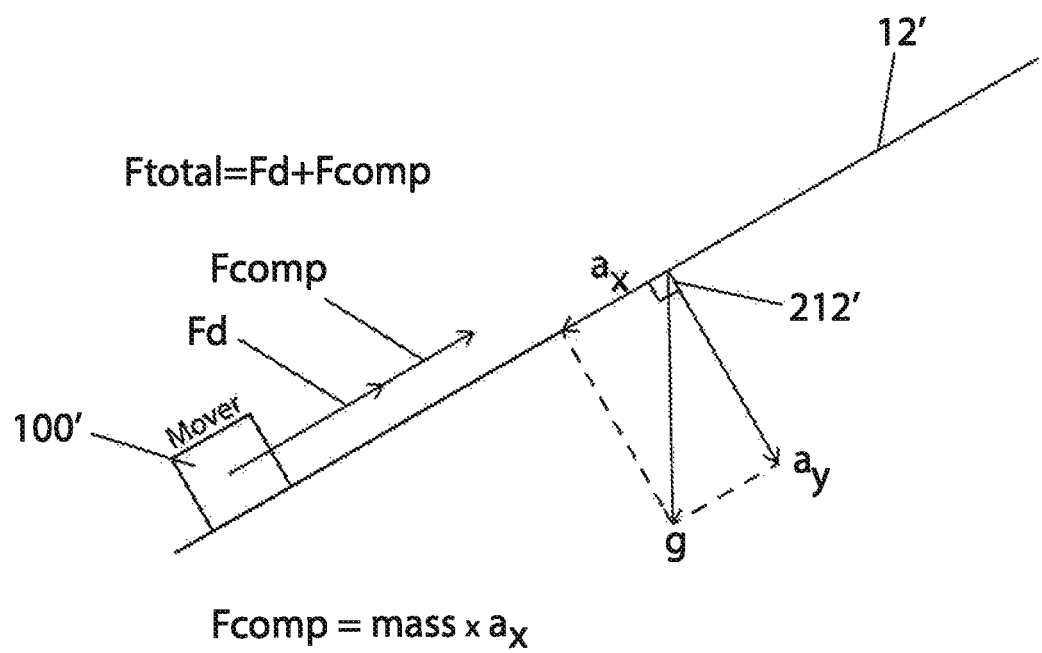
FIG. 6 is a diagram illustrating determination of gravity with respect to a section of track for compensating the force in the block diagram of FIG. 5.

By way of example, with additional reference to FIG. 6, a mover 100' can be controlled to move along a track segment 12' that is oriented at a non-zero angle with respect to the ground, such as up a 45° ramp. A sensor 212' can be configured with respect to the track segment 12' to detect x, y and z vector components of acceleration with respect to the track segment 12'. In FIG. 6, only x and y components "$a_x$" and "$a_y$," respectively, are illustrated in two dimensions for ease of illustration, though a z component can be present. For the static track segment 12', a vector sum of the x, y and z components will correspond to gravity "g."

A controller executing a motion profile for the mover 100' can determine a desired force $F_D$ for moving the mover 100' along a track segment 12 when the track segment 12 is arranged in a reference orientation, such as substantially horizontal or flat with an angle of 0° with respect to the ground. The desired force can comprise a mass of the mover 100' multiplied by a desired acceleration "$a_D$" for the mover 100' in the reference orientation. In addition, the sensor 212' can be used to detect acceleration at the track segment 12' to be compensated. In this example, the acceleration component in the x direction corresponding to the direction of motion of the mover 100' can be compensated while the acceleration component in the y direction corresponding to a direction normal to the track remains static (as does the acceleration component in the z direction which is not shown). Accordingly, the controller executing the motion profile for the mover 100' can determine a compensated force $F_{COMP}$ comprising the acceleration detected by the sensor 212' to be compensated, corresponding to the direction of motion of the mover 100', which is a non-zero angle with respect to the ground, multiplied by the mass of the mover 100'. The controller can then control power from the power supply 180 to the coils 50 for producing a total force $F_{TOTAL}$ on the mover 100', which is the vector sum of the desired force $F_D$ and the compensated force $F_{COMP}$, to move the mover 100' along the track segment 12'.

When the mover 100' transitions to a next track segment 12", a controller, which could be the segment controller 200 for the next track segment 12" or the system controller 30, can then reference the sensor 212" of the next track segment 12" for updating the total force $F_{TOTAL}$, including the desired force $F_D$ and the compensated force $F_{COMP}$.

In one aspect, the controller, such as the segment controller 200 or the system controller 30, can execute to determine the orientation of the track segment 12 from the sensor 212 (detecting the acceleration vector sum from the sensor) to produce a result for the track segment. The result could comprise an angle of the track from a vector sum from the sensor 212 as described above with respect to FIGS. 5 and 6. For example, the result could indicate a track segment 12 oriented at one or more discrete angle steps, such as an angle of 0°, 45°, 90°, or the like, with respect to any detected axis, as detected during system commissioning or run time. The result can then be compared to a parameter for the corresponding track segment 12 stored in a data structure. The parameter could also indicate, for example, the track segment 12 oriented at one or more discrete angle steps, such as an angle of 0°, 45°, 90°, or the like, with respect to any detected axis, as configured at the time of programming. Comparing the one or more results to the one or more parameters can provide automatic "keying" of a sensed orientation versus a programmed orientation for any curvature of the track. This can allow verification of the system for added reliability.

For example, a programmer might have assumed an upright track in which all movers 100 are brought to a bottom track segment 12 in a "Track-Stop" routine. However, if this orientation is changed during commissioning, it may result in undesired effect, such as a free-fall of movers 100 during execution of the Track Stop routine. The aforementioned automatic can detect a keying-mismatch error before such a routine is executed to avoid the undesired effect.

In addition, in one aspect, the controller, such as the segment controller 200 or the system controller 30, can execute to determine the orientation of the track segment 12 from the sensor 212 (detecting the acceleration vector sum from the sensor) at first and second times to produce first and second results, respectively. The first and second times can then be compared to one another to determine an error. For example, if an angle of 45° is detected at the first time as a first result, then an angle of 46° is detected at the second time as a second result, a comparison between the first and second results can reveal an error if. This non-zero error can indicate, for example, an amount of vibration of the track segment 12. Moreover, when the first and second times each occur when a single mover 100 is moving along the track segment 12, the error can indicate a vibration caused by the mover 100, such as faulty bearings or rollers 110.

Figure 7:
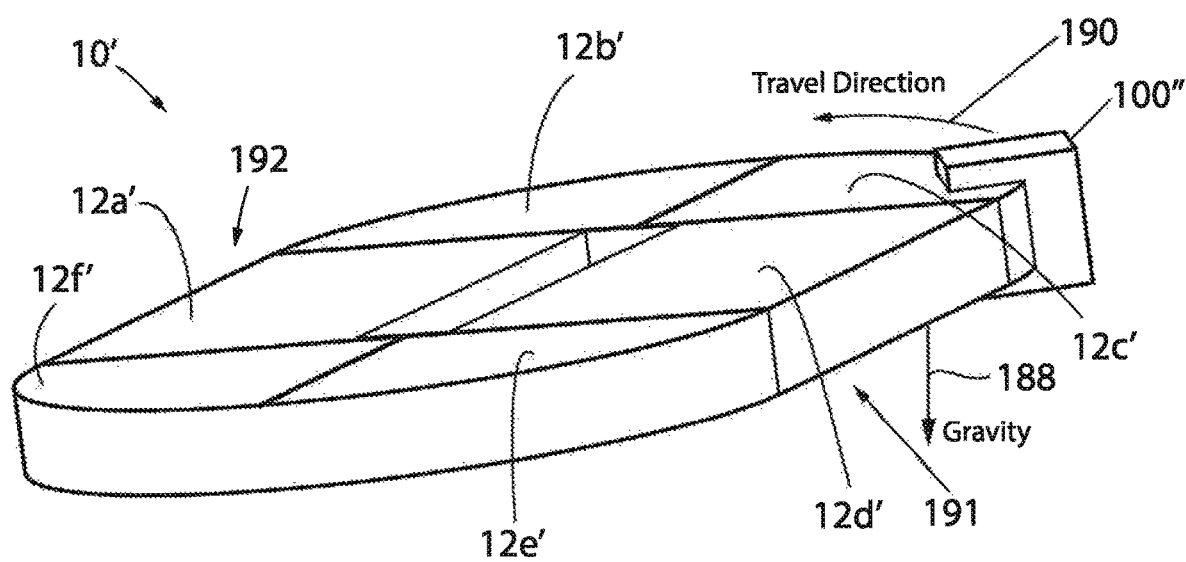
FIG. 7 is a diagram illustrating determination of gravity with respect to a mover in accordance with aspect of the invention.

Referring now to FIG. 7, in another aspect of the invention, to determine an appropriate gravity compensation force to apply with respect to a mover 100", a measured gravity vector 188 can be applied with an instantaneous direction of travel 190 of the mover 100". Information defining the direction of travel 190 can be stored in each section 12, at each position along the section 12, as a 3 dimensional vector on which the mover 100" travels. A section 12 can have arbitrary geometry, and a path of a mover 100" on any given section 12 could follow any 3 dimensional path (and not simply a linear or curved path).

By way of example, a track 10' could have a rear side 191 elevated, so that the track 10' is at a 45 degree angle to level from a front side 192 to the rear side 191. The amount of gravity compensation required as the mover 100" travels around the curve section 12c' (as shown) could vary from zero acceleration at the start of the curve section 12c' to function which could be defined by sqrt(2)*g at the end of the curve section 12c' (i.e., apex of the curve). Accordingly, a stored 3 dimensional path of a mover 100", along with a measured 3 dimensional gravity vector 188 determined from a sensor 212 in the section 12, can be used to calculate an appropriate gravity compensation value for each location on the section.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. A linear motor drive system, comprising:
   a track segment defining a path along which a mover travels, the track segment receiving power from a power supply for electromagnetically propelling a mover, the track segment including:
   a plurality of drive coils spaced along the track segment; and
   a sensor configured to detect an acceleration with respect to the track segment; and
   a controller in communication with the track segment, the controller executing a program stored in a non-transient medium to control power to the drive coils for electromagnetically propelling a mover with a total force to move the mover along the track segment, wherein the total force comprises:
   a desired force for moving the mover along a track segment when arranged in a reference orientation; and
   a compensated force comprising the acceleration for compensating for an orientation of the track segment differing from the reference orientation.

2. The system of claim 1, wherein the sensor is a triple axis micro electro mechanical system (MEMS) digital accelerometer configured to detect x, y and z components of acceleration.

3. The system of claim 1, wherein the compensated force comprises a mass of the mover multiplied by a component of acceleration in a direction of motion of the mover, and wherein the component of acceleration comprises x, y and z components in x, y and z directions, respectively.

4. The system of claim 3, wherein the direction of motion of the mover is stored in the section.

5. The system of claim 2, wherein the track segment further includes a Printed Circuit Board (PCB), wherein the accelerometer is surface mounted to the PCB.

6. The system of claim 1, wherein the reference orientation is defined by an angle of 0° with respect to the ground, and wherein the orientation of the track segment is defined by a non-zero angle with respect to the ground.

7. The system of claim 6, wherein the track segment is arranged as a ramp.

8. The system of claim 1, further comprising the controller executing to determine the orientation of the track segment from the acceleration to produce a result and then compare the result to a parameter for the track segment stored in a data structure.

9. The system of claim 1, further comprising the controller executing to detect the acceleration at first and second times to produce first and second results, respectively, and then compare the first and second results to one another to determine an error.

10. The system of claim 9, wherein the first and second times each occur when the mover is moving along the track segment.

11. The system of claim 10, wherein the error indicates a vibration caused by a faulty mover.

12. A method for propelling a mover, comprising:
receiving power from a power supply for electromagnetically propelling a mover along a track segment defining a path on which the mover travels, the track segment including:
a plurality of drive coils spaced along the track segment; and
a sensor detecting an acceleration with respect to the track segment; and
controlling the power to the drive coils for electromagnetically propelling the mover with a total force to move the mover along the track segment, wherein the total force comprises:
a desired force for moving the mover along a track segment when arranged in a reference orientation; and
a compensated force comprising the acceleration for compensating for an orientation of the track segment differing from the reference orientation.

13. The method of claim 12, wherein the sensor is a triple axis MEMS digital accelerometer detecting x, y and z components of acceleration.

14. The method of claim 13, wherein the track segment further includes a PCB, and further comprising surface mounting the accelerometer to the PCB.

15. The method of claim 12, further comprising defining the reference orientation by an angle of 0° with respect to the ground, and arranging the orientation of the track segment by a non-zero angle with respect to the ground.

16. The method of claim 15, further comprising arranging the track segment as a ramp.

17. The method of claim 12, further comprising determining the orientation of the track segment from the acceleration to produce a result and then comparing the result to a parameter for the track segment stored in a data structure.

18. The method of claim 12, further comprising detecting the acceleration at first and second times to produce first and second results, respectively, and then comparing the first and second results to one another to determine an error.

19. The method of claim 18, further comprising the first and second times each occurring when the mover is moving along the track segment.

20. The method of claim 19, further comprising the error indicating a vibration caused by a faulty mover.

* * * * *